Sept. 8, 1959  A. SOMERVILLE  2,903,590
NUCLEAR RADIATION MEASURING INSTRUMENT
Filed Sept. 17, 1953
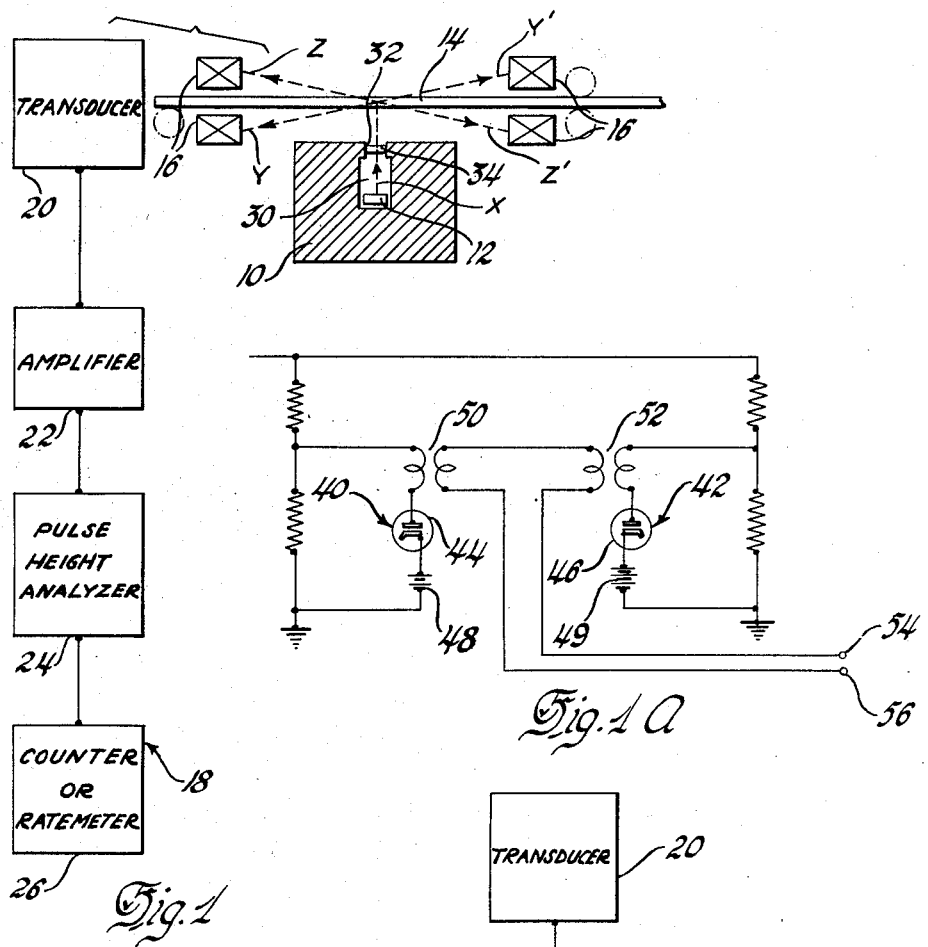
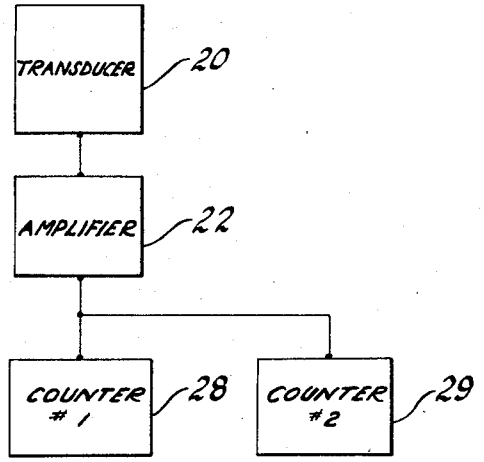
INVENTOR
Alexander Somerville
BY L.D.Burch
ATTORNEY

United States Patent Office 2,903,590
Patented Sept. 8, 1959

2,903,590

NUCLEAR RADIATION MEASURING INSTRUMENT

Alexander Somerville, Birmingham, Mich., assignor to General Motors Corporation, Detroit, Mich., a corporation of Delaware Application September 17, 1953, Serial No. 380,764

6 Claims. (Cl. 250—71)

This invention relates to thickness gages and, more particularly, to thickness gages of the beta ray type.

The invention has for its general object to provide a beta ray measuring gage using positive, rather than negative, beta rays.

Another object is to provide a beta ray gage of the conversion type involving the production of gamma rays converted from positive beta rays and the detection of such gamma rays for measuring such properties as the density-thickness of various materials.

Another object is to provide a beta ray thickness gage characterized by an effective virtual source of gamma rays at the material being measured.

Still another object is to provide a selective type detector responsive principally to gamma ray radiation for use in apparatus of this and of a related character.

In distinction to beta ray thickness gages which employ a source of high energy electrons or negative beta particles and a negative beta particle radiation detector, the thickness gage of the present invention utilizes a source of positive beta particles or positrons and a gamma ray detector. Instruments of the former type depend for their operation on the property that beta rays are absorbed and reflected or, more properly, scattered by any material interposed in their path in a manner which is approximately proportional to the product of the density and thickness of the intervening substance. This property has been incorporated into thickness gages operating on both the transmission and on the reflection principle.

In the existing transmission type of gage, the number of beta particles reaching the radiation detector per unit time, or the energy of the detected beta ray beam, is measured with the material of unknown thickness interposed between the radiation source and the detector and with the material removed from the path of the beam. The percentage difference in the two readings is then taken as a measure of the density-thickness product of the interposed material.

In the reflection type instrument, the detector is located so that it only receives beta ray particles which have been reflected or scattered from the material of unknown thickness. The ratio of the total beta ray beam intensity available in the radiation producing source to the intensity of the back-scattered or reflected beta rays is then taken as a measure of the density-thickness product of the material.

In the conversion type gage employing positive beta ray particles, the positive beta particles are absorbed or reflected in a manner similar to that in which negative beta particles are absorbed and scattered, but, in addition, exhibit a further property of which special advantage is taken in the present invention. When a positron or positive beta particle is slowed down sufficiently in its passage through an absorbing material, it will interact with an electron therein. This interaction results in the annihilation of both the slowed down positron and of the electron with which it has collided and is accompanied by the liberation of two generally oppositely-directed gamma rays, both of which are characterized by an energy content of 0.51 m.e.v. (million electron volts). The number of such gamma rays emitted, therefore, is proportional to the number of positrons which are stopped in the material, which in turn is a function of the density and thickness of the intervening substance. These annihilation gamma rays can be detected by suitable detecting means and the ratio of the number of positrons available in the original beam from the radioactive material emitting the positive beta rays to the number of detected gamma rays can be used as a measure of the density-thickness of the material placed in the path of the positron beam.

Since the emission spectrum distribution curves of negative beta particle emitters differ markedly from those of positive beta radiation sources, it is expected that these differences will favor positive beta instruments over negative beta devices for some special purpose gages. Because conversion type instruments involve the production of gamma rays, which, as is well known, are capable of greater depths of penetration than beta rays, it also would be expected that these instruments, under certain circumstances at least, could measure greater density thicknesses than pure or wholly negative beta ray devices, and for low density-thickness determinations, at least, would be expected to provide more precise determinations.

The above and other objects, features and advantages attending the present invention will appear more fully from the following detailed description and drawings, wherein:

Fig. 1 is a diagrammatic illustration of one form of radiation apparatus embodying the principles of the present invention shown together with suitable detecting and measuring apparatus that may be used in application of the principles of the invention.

Fig. 1a is a schematic electric diagram of a basic form of analyzer device that may be used in the apparatus of Fig. 1; and Fig. 2 is a diagrammatic illustration of a modification that may be used in place of a part of the apparatus of Fig. 1.

Referring to the drawings, 10 is a shield or container for a source 12 of radioactive material emitting nuclear radiation in a beam or path intercepted by a sheet 14 of material of unknown density-thickness to be measured. The devices 16 are radiation detectors which receive nuclear radiation impinging thereon and are associated with a measuring and indicating circuit arrangement collectively designated as 18 herein and comprising, in the relative order named, a transducer device 20, an amplifier 22, a selector or pulse height analyzer 24 and a counter or rate meter 26.

The shield or container 10 is composed of lead and has a cavity 30 defined therein with a small opening 32 communicating between the interior of the cavity and the exterior of the lead container, the opening 32 being provided with a window 34 composed of mica or other suitable material for the protection of operating personnel. The radioactive source 12 is located at the bottom of the cavity and, in accordance with the present invention, may be any known radioactive material emitting positive beta rays, such for example, as the isotope Sodium 22, $Na^{22}$. Nuclear radiation emanates from all portions of the radioactive substance, the dotted path $x$ representing only such energy escaping in a direct path through the opening 32.

The sheet 14 whose density-thickness is to be measured could be any material such as plastic, textile, paper, rubber or metal, and may be supported in any manner spaced slightly from the window 34 of the container 10 so as to intercept or be in the direct path of the emitted positive beta rays. For continuous production gaging, for example, the sheet 14 may be contained on a roll spaced to one side of the container and may be drawn continuously between a pair of rollers on the other side of the container in a sheet intercepting the beta particle beam.

The detector 16 may be any form of nuclear radiation sensitive substance such, for example, as a scintillation of fluorescing type crystal which emits light energy of a characteristic wave length when activated by impinging high-velocity particles or other nuclear radiation, the intensity of the emitted light energy being proportional to the energy content of the radiation incident thereon. Sodium-iodide crystals are frequently employed for such purposes in scintillation counters. Instead of a scintillation type radiation detector, a Geiger tube, proportional counter tube or an ionization chamber could be employed.

In distinction to transmission type gages wherein the radiation detector is placed in the direct path of the beam and on the opposite side of the sheet from the radiation source, and to reflection type instruments wherein the detector is placed on the side of the sheet nearest the container, the detector means of the present invention may be placed on either or both sides of the sheet, and further, are displaced on one side or other or on opposite sides of the direct path $x$ of the emitted rays, thereby to receive principally those rays resulting from the collision of the positron particles with electrons in the sheet being measured. As earlier mentioned, the collision of a positron particle with an electron in the sheet results in the production of two gamma rays for each annihilated positive beta ray with the gamma rays following generally-opposite paths, such as $y$, $y'$ and $z$, $z'$, in a substantially different direction from the path of the emitted positive beta rays. To assure maximum collection of gamma ray radiation, and therefore, maximum sensitivity of the apparatus, an arrangement such as that shown in Fig. 1, in which the detectors are placed on both sides of the sheet and displaced on both sides laterally of the beam $x$ preferably is employed. However, any combination of detector locations shown, and even a single detector at any of the locations illustrated, could be employed. Depending on the size of the installation and on the size of the scintillation crystals that may be available, the detectors on the same side of the sheet could be of annular ring-like or cylindrical formation.

Since the gamma rays are produced by the interaction of an electron in the sheet and an emitted positron particle the velocity of which has been decreased sufficiently in passing into or through the sheet, it may be considered that there is a virtual or effective source of gamma rays at or within the sheet itself.

If the above scintillation type detector arrangement is employed, the transducer 20 may be a light sensitive pickup device responsive to illumination of the wavelength emitted from the crystals. The pickup device could be a photo cell, preferably a conventional electronic type photo-multiplier tube. Detector transducer arrangements may be used in which the scintillation crystal and photo-multiplier tube are contained within a magnetic head or shield with the multiplier tube immediately adjacent the crystal and separated therefrom, perhaps, by a light collecting prism, such devices being known in the art. A single tube or photo conductive device arranged to receive illumination from all of the crystals, or several such light responsive pickup devices, also could be employed. The output of the photo-tube will appear in the form of a number of pulses of different amplitude corresponding to the intensity of the illumination emitted from the radiation detector the intensity of which illumination is in turn proportional to the intensity of the high velocity nuclear particles or radiation impinging on the detectors.

The pulsed output of the photo-multiplier tube or tubes is applied preferably through a cathode-follower stage for impedance matching to the voltage amplifier 22, which may be of any type well known in the art and may comprise several cascaded stages. The cathode follower may be contained either within the scintillation head or in the amplifier. From the amplifier the amplified pulses are supplied to the selector circuit or pulse height analyzer 24, the output of which is supplied to the counter or rate meter 26.

The pulse height analyzer or gamma radiation selector circuit 24 could be, for example, a pair of electronic transducers with unequally delayed outputs, i.e., in point of amplitude, the inputs of which are connected in parallel to the output of the amplifier 22. A pair of Oakridge A-1 Linear Amplifiers, RCL mark 15 Model A-1, manufactured and sold by Radiation Counter Laboratories, Inc., of Chicago, Illinois, could be employed for this purpose. These instruments integrate the current or voltage pulse from the radiation detector, amplify and differentiate the resulting voltage, provide further amplification and reject all pulses of amplitude below a predetermined or preselected amplitude setting. Two such instruments could be used in parallel each operating at a different amplitude level with their outputs connected in differential relation so as to pass or select only those pulses lying within a predetermined amplitude pass band corresponding, for example, to annihiliation gamma ray particles lying within a spectral emission energy range of say, 0.48 to 0.54 m.e.v.

A basic form of pulse height analyzer is illustrated in the simple schematic diagram of Fig. 1a wherein a pair of rectifier circuits 40, 42 are connected in parallel to the output of the voltage amplifier 22. Elements 44 and 46 may be simple diode rectifiers with element 44 being biased by means of a battery 48 proportioned to provide conduction of the rectifier circuit 40 at pulse heights corresponding to detected radiation of at least 0.48 m.e.v. and element 46 being biased by means of the battery 49 proportioned to provide conduction of its circuit for pulse heights corresponding to detected radiation having an energy of at least 0.54 m.e.v. The outputs of the rectifier circuits 40 and 42 are connected through the transformers 50 and 52, associated with respective ones of said circuits, to be combined in differential relationship so as to supply at the output terminals 54, 56 thereof pulse amplitudes lying within a pass band corresponding to detected gamma ray radiation lying within the range of 0.48 to 0.54 m.e.v. As mentioned earlier, the annhiliation gamma rays are characterized by an energy content of 0.51 m.e.v., so that all other radiation incident on the detector lying without this pass band will be filtered therefrom. Such energy lying within this preselected range will be principally that due to the annihilation gamma rays, and any other radiation particles having an energy content within this range, such for example, as stray cosmic radiation, will be so few in number as to produce no noticeable effect on the output of the analyzer which is applied to the counter or rate meter 26. The counter or rate meter 26 may be of any conventional form known in the art adapted to produce a time-integrated average of the pulses applied thereto. For continuous production sheet gaging a rate meter with a recording chart instrument may be employed. Suitable counters and rate meters that may be used for these purposes are manufactured by and available from Radiation Counter Laboratories mentioned above.

In place of the pulse height analyzer 24 and single counter 26 of the apparatus of Fig. 1, an arrangement as in Fig. 2 of two counters or scalers 28, 29 each connected to the output of the amplifier 22 and adapted to provide counts at different pulse amplitude levels could be employed. One counter may be adapted to provide counts of pulses having an amplitude corresponding to detected radiation of an energy level of 0.48 m.e.v. and above and the other of pulses corresponding to detected radiation of 0.54 m.e.v. and above. The counts are taken for a fixed time and the difference of the number of counts for this interval may be taken as an indication of the number of detected annihilation gamma rays.

While the invention has been described herein as a thickness gage, it is adapted for other applications. For example, with materials of known thickness, the apparatus may be employed to obtain determinations of the mass-density content of the material for purposes of obtaining qualitative and/or quantitative analyses of the particular composition thereof, as, for example, when it is desired to determine the concentration of lead or other like substances in gasoline. Still another application for such devices may be as a stock sorter in which it has been noticed that different determinations will be obtained with the instrument where the crystalline structure of the stock passed through the path of the beam is principally in one direction than when the stock is passed through the instrument with the crystalline structure in another direction, say at right angles thereto. Thus the present apparatus could be employed to sort or detect the differences between hot rolled steel and cold rolled steel, for example, by noting the differences in readings obtained with the instrument with the stock passed through it in one direction and in another direction.

What is claimed is:

1. Apparatus for measuring the density-thickness of known materials comprising, in combination, a radioactive source emitting positive beta ray particles in a path adapted to be intercepted by a material of unknown density-thickness, detector means adjacent said material being measured and responsive to gamma rays resulting from the annihilation of an emitted positive particle with an electron in the material being measured, selector means energized from said detector means transmitting such energy incident on the detector means as lies within the range extending from 0.48 m.e.v. to 0.54 m.e.v. corresponding to the energy level of said annihilation gamma rays and counting means connected to said selector means providing a time-integrated average of the number of gamma rays impinging on said detector means as a measure of the density-thickness of said material.

2. The combination in accordance with claim 1 above wherein said selector means is a pulse height analyzer constituted by a pair of unequally biased electronic transducers having parallel connected inputs and differentially combined outputs.

3. Apparatus for measuring the density-thickness of known materials comprising, in combination, a radioactive source emitting positive beta ray particles in a path adapted to be intercepted by a material of unknown density-thickness, detector means including an array of scintillation crystals adjacent said material being measured and responsive to gamma ray radiation resulting from the annihilation of an emitted positive beta particle with an electron in the material being measured, light responsive means actuated by radiation from said scintillation crystals when the latter are activated by said annihilation gamma rays incident thereon to produce a pulsed output the intensity of which is related to that of the radiation on said crystals, amplifying means connected to said light responsive means, pulse height analyzing means having a transmission pass band extending between 0.48 and 0.54 m.e.v. corresponding to the energy level of said annihilation gamma rays, and counting means connected to said selector means providing a time-integrated average of the number of gamma rays impinging on said crystals as a measure of the density-thickness of said material.

4. Apparatus for measuring the density-thickness of known materials comprising, in combination, a radioactive source emitting positive beta ray particles in a path adapted to be intercepted by a material of unknown density-thickness, detector means adjacent said material being measured and responsive to gamma rays resulting from the annihilation of an emitted positive beta particle with an electron in the material being measured and a pair of counting means each actuated by said detector means, said counting means being unequally biased to different amplitude levels and each providing an indication of the number of detected particles of nuclear radiation having an energy content above the particular biasing level thereof, said biasing levels corresponding approximately to the range of energy levels extending between 0.48 m.e.v. and 0.54 m.e.v. and corresponding to said annihilation gamma rays, the difference in counts of said counting means being proportional to the number of gamma rays detected and a function of the density-thickness of the material being measured.

5. In combination, receiving means defining a space adapted to be occupied by known materials of different density-thickness, a source of positive beta particles disposed adjacent said receiving means and emitting said particles in a beam directed through said space whereby the material within said space becomes a virtual source of annihilation gamma radiation having an intensity corresponding to the proportion of the positive beta particles stopped by the material and combining with an electron therein, gamma radiation detector-selector means disposed adjacent said receiving means and being responsive only to radiation having an energy level corresponding to the energy of said annihilation gamma radiation whereby background radiation of different energy levels is rejected, said detector-selector means producing a signal corresponding to the intensity of said annihilation gamma radiation, and counting means connected with said detector-selector means for indicating the density-thickness of the material within said space.

6. In combination, receiving means defining a space adapted to be occupied by known materials of different density-thickness, a source of positive beta particles disposed adjacent said receiving means and emitting said particles in a beam directed through said space whereby the material within said space becomes a virtual source of annihilation gamma radiation having an intensity corresponding to the proportion of the positive beta particles stopped by the material and combining with an electron thereof, gamma radiation detector means adjacent said receiving means and producing a signal corresponding to the intensity of gamma radiation, selector means connected with said detector means and having a narrow pass band for transmitting only the detector signals corresponding to the gamma radiation energy in the energy range between 0.48 m.e.v. and 0.54 m.e.v. and counting means connected to said selector means responsive to the transmitted detector signals for indicating the density-thickness of said material.

References Cited in the file of this patent

UNITED STATES PATENTS

| | | |
|---|---|---|
| Re. 22,531 | Hare | Aug. 22, 1944 |
| 2,488,269 | Clapp | Nov. 15, 1949 |
| 2,509,344 | Herzog | May 30, 1950 |
| 2,682,000 | Clayton et al. | June 22, 1954 |
| 2,723,351 | Garrison et al. | Nov. 8, 1955 |
| 2,749,446 | Herzog | June 5, 1956 |

OTHER REFERENCES

Gamma-Rays from Fluorine Due to Proton Bombardment, by Bernet et al. from Physical Review, vol. 54, pages 398–399; September 15, 1938.